(12) United States Patent
Moore et al.

(10) Patent No.: US 6,262,226 B1
(45) Date of Patent: Jul. 17, 2001

(54) PROCESS FOR PRODUCING A HIGH MOLECULAR WEIGHT CONDENSATION POLYMER

(75) Inventors: Eugene R. Moore; George J. Quarderer, Jr.; Clark J. Cummings, all of Midland, MI (US); Danil Tirtowidjojo, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/549,323

(22) Filed: Apr. 13, 2000

Related U.S. Application Data

(60) Provisional application No. 60/132,973, filed on May 7, 1999.

(51) Int. Cl.⁷ ........................................................ C08F 6/00
(52) U.S. Cl. ............................................................. 528/480
(58) Field of Search ............................................... 528/480

(56) References Cited

U.S. PATENT DOCUMENTS

| | | | |
|---|---|---|---|
| 3,329,410 | 7/1967 | Rothert | ................. 528/483 |
| 4,940,472 | 7/1990 | Hay, II et al. | . |
| 4,952,672 | 8/1990 | Moore et al. | . |
| 5,635,589 | 6/1997 | Tynan | ................. 528/483 |

FOREIGN PATENT DOCUMENTS

| | | |
|---|---|---|
| 24424 | 1/1989 | (JP) . |
| 99 64477 | 12/1999 | (WO) . |

OTHER PUBLICATIONS

*Melt Polycondensation of Poly(Ethylene Terephthalate) in a Rotatingdisk Reactor*, S. I. Cheong et al, Journal of Applied Polymer Science, vol. 58, No. 9, pp. 1473–1483, 1995, John Wiley and Sons Inc., New York.

Chemical Abstract AN 110:24424, *Analysis of the Rotating Drum Polycondensation Reactor for PET Synthesis*, Kwan Han Yoon et al, Chemistry of Synthetic High Polymers.

Haw, Jimkuo; Mass Transfer of Centrifugally Enhanced Polymer Devolatilization by Using Foam Metal Packed Bed; Jan. 1995; Case Western Reserve University.

*Primary Examiner*—Terressa M. Boykin

(57) ABSTRACT

The present invention is directed to a process for producing a high molecular weight condensation polymer by removing unwanted by-product(s) from a polycondensation equilibrium reaction mixture using a centrifugal force device equipped with a vacuum.

7 Claims, No Drawings

PROCESS FOR PRODUCING A HIGH MOLECULAR WEIGHT CONDENSATION POLYMER

This application claims the benefit of U.S. Provisional Application No. 60/132,973, filed May 7, 1999.

BACKGROUND OF THE INVENTION

This invention relates to a process for producing a high molecular weight condensation polymer.

The weight average molecular weight (Mw) of a condensation polymer is frequently limited by the formation and presence of by-products during the polycondensation reaction. In these types of polycondensation equilibrium reactions, which are driven by the removal of a by-product, e.g. water, alcohol, phenol, etc., removal of the by-product enables the polymer chain end to react further, thus building the molecular weight of the polymer produced. However, methods of removing by-product(s) during the reaction process are difficult and costly due to the increased viscosity of the polymer produced. For example, DE-4,236,039 discloses a method for the production of condensation polymers by circulating the reaction mixture through tubular heat exchangers to remove a majority of the water by-product, further completing the reaction, and removing additional water by-product in a secondary similar stage. This process requires multiple reactors, and water removal stages. Other methods of solving the problem associated with removing unwanted by-products from polycondensation equilibrium reactions include diffusion and solid state polymerization processes. However, these methods incorporate long residence times, which can cause other additional by-products, such as color bodies or gels, to form.

Therefore, there remains a need for a more efficient and rapid process for removing by-product(s) from polycondensation equilibrium reaction mixtures and thus increasing the molecular weight of the condensation polymer produced.

SUMMARY OF THE INVENTION

The present invention is a process for producing a high molecular weight condensation polymer utilizing a centrifugal force device. The centrifugal force device causes the condensation polymer reaction mixture to flow such that thin films are formed and unwanted by-product(s) is rapidly diffused from the polymer reaction mixture to a vapor phase where it is removed via vacuum, allowing further reaction and molecular weight build-up of the polymer produced.

This process is an efficient and rapid method of removing unwanted by-product(s) from the polycondensation equilibrium reaction. This process further provides very short residence times and increased mass transfer.

DESCRIPTION OF THE PREFERRED EMBODIMENTS

Polycondensation equilibrium reactions are reactions in which the polymerization reaction and its reverse reaction occur at the same rate, resulting in a constant concentration of reactants, and is therefore driven by the removal of one of the products, i.e. a by-product, such as water, alcohol, phenol and the like. Removal of the by-product(s) allows further reaction to occur, thus increasing the molecular weight of the polymer produced.

The present invention is a process for producing a high molecular weight condensation polymer by causing further reaction of a low molecular weight condensation polymer having at least one reactive chain end, by removing unwanted by-product(s) from the polycondensation equilibrium reaction mixture. A condensation polymer is defined for the purpose of the present invention, as a polymer produced from a polycondensation equilibrium reaction, wherein at least one by-product is produced, and wherein such by-product(s) inhibits the completion of the polymerization reaction due to an equilibrium state.

The polycondensation equilibrium reaction mixture refers to a mixture comprising one or more unreacted monomers, low molecular weight condensation polymer having at least one reactive chain end and at least one unwanted by-product of the polycondensation equilibrium reaction.

Polymers which would benefit from the process of the present invention are limited to those polymers produced by polycondensation equilibrium reactions, i.e. from monomers which produce by-products that inhibit further completion of the polycondensation reaction. Those skilled in the art can easily ascertain which reaction schemes or monomer(s) would lead to polymers produced by polycondensation equilibrium reactions. For example, such polymers and monomer(s) include but are not limited to, polycarbonate produced from diphenylcarbonate and bisphenol A, giving phenol as an unwanted by-product; polycarbonate produced from dimethylcarbonate and bisphenol A, giving methanol as an unwanted by-product; polylactic acid produced from lactic acid and giving water as an unwanted by-product; Nylon 6,6 produced from adipic acid and hexamethylene diamine, giving water as an unwanted by-product; polyethylene terephthalate produced from ethylene glycol and terephthalic acid, giving water and ethylene glycol as unwanted by-products (ethylene glycol reacts with terephthalic acid, forming water and bishydroxyethylterephthalate, which then polymerizes to form polyethylene terephthalate and produces ethylene glycol): and polyethylene terephthalate produced from ethylene glycol and dimethyl terephthalate; giving methanol as an unwanted by-product.

Methods of producing polycondensation equilibrium type polymers and polycondensation equilibrium reactions are also well known in the art.

A low molecular weight condensation polymer is defined as a polymeric material having at least one reactive chain end, produced from a polycondensation equilibrium reaction which is limited in molecular weight by the presence of by-product(s) in the polycondensation equilibrium reaction mixture. In other words, the low molecular weight condensation polymer is the polymer having at least one reactive chain end produced prior to any removal of unwanted by-product(s) and subsequent increase in molecular weight.

The term 'unwanted by-product' refers to any product of the polycondensation equilibrium reaction which is not considered a condensation polymer. Unwanted by-product(s) will vary depending upon the condensation polymer being produced. Exemplary by-products include water, phenol, ethylene glycol, and the like. The by-product(s) is typically in liquid form, dissolved in the low molecular weight condensation polymer and easily removed from the polymer into the vapor phase by the centrifugal force device under vacuum.

The polycondensation equilibrium reaction can be conducted in a separate reaction vessel, or alternatively in the centrifugal device itself If conducted in a separate reaction vessel, the high molecular weight condensation polymer is produced by a process comprising:

a) feeding a stream comprising one or more monomers capable of producing a condensation polymer in a polycondensation equilibrium reaction, into a reaction zone;

b) polymerizing the monomer(s) to form a polycondensation equilibrium reaction mixture comprising a low molecular weight condensation polymer having at least one reactive chain end, unreacted monomer(s) and at least one unwanted by-product;

c) feeding the polycondensation equilibrium reaction mixture of b) to a centrifugal device equipped with a vacuum; and d) rotating the centrifugal force device at a sufficient angular velocity such that the polycondensation equilibrium reaction mixture forms thin films, rapid diffusion of unwanted by-product from the polycondensation equilibrium reaction mixture to the vapor phase is achieved, and the unwanted by-product(s) is substantially removed via the vacuum, causing further reaction of the reactive low molecular weight condensation polymer chain end(s).

If the polycondensation equilibrium reaction is conducted in the centrifugal device, the process comprises:

a) feeding a stream comprising one or more monomers capable of producing a condensation polymer in a polycondensation equilibrium reaction, into a reaction zone within a centrifugal device equipped with a vacuum;

b) polymerizing the monomer(s) to form a polycondensation equilibrium reaction mixture comprising a low molecular weight condensation polymer having at least one reactive chain end, unreacted monomer(s) and at least one unwanted by-product; and c) rotating the centrifugal force device at a sufficient angular velocity such that the polycondensation equilibrium reaction mixture forms thin films, rapid diffusion of unwanted by-product from the polycondensation equilibrium reaction mixture to the vapor phase is achieved and the unwanted by-product(s) is substantially removed via the vacuum, causing further reaction of the reactive low molecular weight condensation polymer chain ends.

Centrifugal force devices have previously been used in other processes, such as in the devolatilization of polymer produced from ethylenically unsaturated monomers. However, in such processes, volatile materials are removed to decrease the residual levels of the finished polymer and no significant further reaction of the polymer occurs.

The centrifugal force device utilized in the present invention can be any device which utilizes centrifugal force to cause polymer flow such that thin films are formed, and allows rapid diffusion of unwanted by-product(s) out of the thin liquid polymer into the vapor phase, and removal of the by-product(s) from the vapor phase under vacuum. The device is typically a centrifugal device as disclosed in U.S. Pat. Nos. 4,940,472 and 4,952,672 which are herein incorporated by reference. As disclosed therein, the centrifugal force device typically comprises a rotatable annular chamber having an inlet, a first outlet located at a first distance from the axis of rotation of the chamber, and a second outlet located at a second distance from the axis of rotation of the chamber. The portion of the chamber located between the first and second outlets forms an annular pocket or subchamber. The device also includes means to rotate the annular chamber at a speed sufficient to cause the polymer mixture to flow through the first and second outlets. A vacuum source communicating with the annular pocket is provided for removing the unwanted by-product(s) from the polycondensation equilibrium reaction mixture. A flow of a warm, dry gas enhances mass transfer and separation and removal of the by-product(s) from the polycondensation equilibrium reaction mixture.

In one embodiment, the centrifugal device comprises a hollow chamber filled with a material having a large surface area, such as macroreticular metal foam, wire screen, wound woven metallic mesh or some other type of packing. In the process of the present invention, the polycondensation equilibrium reaction mixture is distributed as a thin film on the inner surfaces of the large surface area material, and is pulled radially by the centrifugal force over the extended surface area during rotation. The film thus formed has a greater surface area for the dissipation of by-product(s) from the polycondensation equilibrium reaction mixture, and thus provide further removal of the by-product(s). This also results in rapid surface renewal, i.e. repeatedly exposing new materials to the surface or gas/liquid interface. The combination of these thin films and surface renewal results in rapid mass transfer.

Further, in another embodiment, the centrifugal force device additionally includes means for heating the polycondensation equilibrium reaction mixture and a stationary housing supporting a rotatable annular chamber, the annular chamber having an inlet for the polycondensation equilibrium reaction mixture and an outlet. The device further includes means to rotate the annular chamber and a vacuum source communicating with the annular pockets is provided for removing by-product(s) from the polycondensation equilibrium reaction mixture.

Centrifugation at an angular velocity which produces a centrifugal gravity G in the order of approximately 50 to 6,000, preferably to 10,000 times the normal gravitational pull will readily separate liquid by-product(s) from the low molecular weight condensation polymer by causing the polymer to form thin films, and allow rapid diffusion of the by-product(s) into the vapor phase. When treating a polycondensation equilibrium reaction mixture with such centrifugation, the liquid by-product(s) is promptly pulled from the walls and/or interstices of any irregular surfaces, the substantial amount of by-product that may be present with the low molecular weight condensation polymer is removed and substantially by-product free low molecular weight condensation polymer liquid remains.

Increased temperatures may enhance the removal of some unwanted by-product(s). Typically, conditions such as pressure and temperature will depend upon the polymer and by-product(s) produced, wherein the temperature is at least the temperature at which the by-product(s) will vaporize for a given pressure.

The amount of by-product(s) removed from the polycondensation equilibrium reaction mixture will also depend upon the polymer being produced. Generally, at least 100 ppm, typically at least 500 ppm, preferably at least 1,000 ppm, more preferably at least 3,000 ppm, even more preferably at least 6,000 ppm, and most preferably at least 10,000 ppm based on the weight of the polycondensation equilibrium reaction mixture, of by-product(s) is removed from the polycondensation equilibrium reaction mixture.

The further reaction of the low molecular weight condensation polymer having at least one reactive chain end, caused by the removal of by-product(s), significantly increases the molecular weight of the condensation polymer chain. The molecular weight is generally increased by at least 10 percent, typically at least 50, preferably at least 100, more preferably at least 200, even more preferably at least 350 and most preferably at least 500 percent, based on the original molecular weight of the low molecular weight condensation polymer having at least one reactive chain end.

Methods of terminating condensation polymerizations, if needed, are well known in the art, such as the addition of a monofenctional material to the condensation polymer reaction mixture.

In one embodiment of the present invention, the polycondensation equilibrium reaction mixture comprising low molecular weight condensation polymer having at least one reactive chain end and at least one unwanted by-product, is fed into the centrifugal device, the device rotates at a sufficient angular velocity to cause the formation of thin films, rapid diffusion and removal of the by-product(s) via the vacuum, the polycondensation equilibrium reaction continues, thus increasing the molecular weight of the low molecular weight condensation polymer having at least one reactive chain end to form a high molecular weight condensation polymer, the high molecular weight condensation polymer is forced out of the device through aperture(s) as strands, the strands are cut or pelletized by impingement on a stationary knife and the pellets are cooled.

What is claimed is:

1. A process for producing a condensation polymer from a polycondensation equilibrium reaction, wherein the polycondensation equilibrium reaction produces a polycondensation equilibrium reaction mixture which comprises a condensation polymer having at least one reactive chain end and at least one unwanted by-product, and wherein such by-product inhibits the completion of the polymerization reaction due to an equilibrium state, comprising:

removing the unwanted by-product from the polycondensation equilibrium reaction mixture using a centrifugal force device equipped with a vacuum, wherein the centrifugal force device is rotated at a sufficient angular velocity such that the polycondensation equilibrium reaction mixture forms thin films, rapid diffusion of unwanted by-product from the polycondensation equilibrium reaction mixture to the vapor phase is achieved, and the unwanted by-product(s) is substantially removed via the vacuum, causing the further reaction of the condensation polymer chain end(s).

2. The process of claim 1 wherein the angular velocity is from 50 to 10,000 times the normal gravitational pull.

3. The process of claim 1 wherein at least 1,000 ppm, based on the total weight of the polycondensation equilibrium reaction mixture, of by-product(s) is removed from the polycondensation equilibrium reaction mixture.

4. The process of claim 1 wherein at least 6,000 ppm, based on the total weight of the polycondensation equilibrium reaction mixture, of by-product(s) is removed from the polycondensation equilibrium reaction mixture.

5. The process of claim 1 wherein at least 10,000 ppm, based on the total weight of the polycondensation equilibrium reaction mixture, of by-product(s) is removed from the polycondensation equilibrium reaction mixture.

6. A process for producing a condensation polymer comprising:
   a) feeding a stream comprising one or more monomers capable of producing a condensation polymer in a polycondensation equilibrium reaction, into a reaction zone;
   b) polymerizing the monomer(s) to form a polycondensation equilibrium reaction mixture comprising a condensation polymer having at least one reactive chain end, unreacted monomer(s) and at least one unwanted by-product;
   c) feeding the polycondensation equilibrium reaction mixture of b) to a centrifugal device equipped with a vacuum; and
   d) rotating the centrifugal force device at a sufficient angular velocity such that the polycondensation equilibrium reaction mixture forms thin films, rapid diffusion of unwanted by-product from the polycondensation equilibrium reaction mixture to the vapor phase is achieved, and the unwanted by-product(s) is substantially removed via the vacuum, causing further reaction of the reactive condensation polymer chain end(s).

7. A process of producing a condensation polymer comprising:
   a) feeding a stream comprising one or more monomers capable of producing a condensation polymer in a polycondensation equilibrium reaction, into a reaction zone within a centrifugal device equipped with a vacuum;
   b) polymerizing the monomer(s) to form a polycondensation equilibrium reaction mixture comprising a condensation polymer having at least one reactive chain end, unreacted monomer(s) and at least one unwanted by-product; and
   c) rotating the centrifugal force device at a sufficient angular velocity such that the polycondensation equilibrium reaction mixture forms thin films, rapid diffusion of unwanted by-product from the polycondensation equilibrium reaction mixture to the vapor phase is achieved, and the unwanted by-product(s) is substantially removed via the vacuum, causing further reaction of the reactive condensation polymer chain ends.

* * * * *